3,790,599
PREPARATION OF α-AMINOACIDS FROM
HYDANTOINS
Jean Louis Zundel, 30 Rue Pierre Geofroix,
Colombes (Hauts-de-Seine), France
No Drawing. Filed June 10, 1970, Ser. No. 45,270
Claims priority, application Great Britain, June 10, 1969,
29,350/69
Int. Cl. C07d 27/52; C07c 99/00, 101/00
U.S. Cl. 260—326.14 T                                14 Claims

ABSTRACT OF THE DISCLOSURE

Alpha-amino acids are produced by hydrolyzing hydantoins with a strong base in the presence of an acid having a dissociation constant of $1 \times 10^{-2}$ to $1 \times 10^{-12}$.

---

The present invention is concerned with a process for the preparation of α-aminoacids by the hydrolysis of the corresponding hydantoins. The hydrolysis reaction is represented by the following equation:

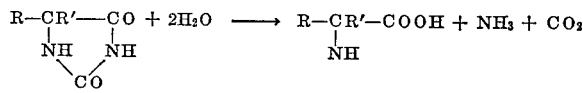

where R and R', which may be the same or different, are hydrogen or an organic radical.

The hydrolysis is generally carried out in an alkaline medium, the medium containing, for example, barium, calcium or sodium hydroxide as the base.

There is described in U.S. Pat. No. 2,557,920 a process of this kind in which the hydantoin is treated with caustic soda in a proportion of 3 moles of NaOH per mole of hydantoin in an autoclave at a temperature of from 130° to 300° C. and under pressure. This process gives excellent yields, but is subject to the disadvantage that it requires a considerable consumption of caustic soda, the excess of which has to be neutralized with the corresponding quantity of a strong acid; in addition it is difficult to obtain a sufficiently pure aminoacid in a good yield from the reaction medium containing a high proportion of salt obtained as a result of such neutralization.

When operating with a closed autoclave under the conditions described in the said U.S. patent, experiments confirm that it is necessary to use about 3 moles of NaOH per mole of hydantoin in order to obtain a yield of aminoacid of from 92 to 98%. This is explained by the fact that, under the operating conditions, the hydantoin and the aminoacid formed therefrom, one the one hand, and the carbonic acid formed, on the other hand, are strongly ionized and equilibrate $Na^+$ ions while the ammonia formed remains substantially non-ionized. In order to maintain the medium alkaline, it is necessary, therefore, to have present more $Na^+$ ions than the sum of the aminoacid and $CO_3^-$ ions. Considering the caustic soda to be totally ionised, which is not the case with the aminoacid and the carbonic acid, it is, therefore, necessary to have present about 2.5 moles of caustic soda (per mole of hydantoin) in order to maintain the medium alkaline and to continue the hydrolysis of the hydantoin to completion.

However, if during the course of the reaction, the ammonia and the carbon dioxide are allowed to escape in a suitable manner into the free space above the liquid in the autoclave, there is substantially complete elimination of the ammonia dissolved in the solution and a substantial part of the carbonic acid. Under these conditions, the quantity of caustic soda can be reduced to about 2 moles per mole of hydantoin. This process is the subject of French Pat. No. 1,462,039, but contrary to what is stated in this patent, the yields obtained are less than those obtained currently with the process of the said U.S. patent. In particular, α-hydroxy-acid, dipeptide and diketopiperazine are formed which is explained by moving the equilibrium in favor of the hydrolysis of the amine function due to the elimination of the ammonia and the removal of water vapor in the course of the reaction. Thus in Example 4 of the said French patent, the hydrolysis yield is only 90.9% and it requires 2 moles of NaOH to attain only 93.7% in Example 5, while with the process of the said U.S. patent, yields of more than 96% are currently obtained. In addition, in the process of the said French patent, it is necessary to use a much more diluted medium, which is confirmed by French Pat. No. 1,533,556 (of the same patentee as French Pat. No. 1,462,039) which specifies that at least 1.5 l., and preferably 2 l., of solution per mole of hydantoin are required in order to obtain a good yield, while in the process of said U.S. patent, the best yields are obtained with 0.8 liter of solution per mole of hydantoin.

The present invention is based on the discovery of means for preventing the carbonic acid liberated during the reaction, from ionizing, while maintaining the medium alkaline. Under the conditions of the process, $NH_3$ and $CO_2$ are in the gaseous state and are dissolved or dispersed in the solution under the effect of pressure and agitation. The gases can be liberated during the hydrolysis by partial expansion, which is continuous or discontinuous and which enables the process to be carried out at a lower pressure, but the yield is slightly lower than when the process is carried out in a closed autoclave.

According to the present invention, I provide a process for the preparation of an alpha-amino-carboxylic acid by hydrolysing the corresponding hydantoin with a strong base, in which the hydrolysis is carried out in the presence of an acid which has a dissociation constant of from $1.10^{-2}$ to $1.10^{-12}$ and which, because of its greater solubility, is capable of displacing carbonic acid ions from the solution.

Hydrolysis is preferably effected with from 0.3 to 1.6, advantageously 0.5 to 1.3, cation mole equivalents of the strong base, such as caustic soda, per mole of hydantoin.

Suitable acids for this purpose include, for example, acetic, oxalic, phosphoric and sulphurous acids. Sulphuric acid, of which the second K constant is $2.10^{-2}$, can also be used.

It is necessary to add to the aqueous caustic soda solution of the hydantoin, a quantity of acid such that the pH of the resulting solution is from 8.5 to 11, and preferably from 9 to 10; this corresponds for the specific acids mentioned above to form 0.5 to 0.9 mole equivalent of acid per mole of NaOH.

The process according to the invention can be applied, for example, to a solution of hydantoin obtained by reacting an aldehyde or a ketone with hydrocyanic acid or sodium cyanide in the presence of ammonia and carbon dioxide or ammonium bicarbonate. When sodium cyanide is used and the solution already contains 1 to 1.1 mole of NaOH per mole of hydantoin, it is sufficient to add the necessary quantity of acid.

In the other cases, a mixture of a suitable proportion of caustic soda and the sodium salt of the chosen acid, for example, sodium formate, acetate or phosphate, trisodium phosphate, or sodium metabisulphite or sulphate, can be used.

The hydrolysis of the solution prepared as described above is carried out by heating in an autoclave at a temperature of from 120° to 180° C., preferably from 135° to 170° C., for a reaction period of from 10 to 90 minutes, preferably from 10 to 45 minutes. The higher the reaction temperature, the shorter the reaction period required. In this connection, a second advantage of the process according to the invention, as compared with the processes of the patents referred to above, is that at the same temperature, the reaction time required for a hydrolysis according to the invention is shorter, whereas for the same reaction time, the temperature required is lower.

When the hydrolysis reaction is complete, the gases contained in the autoclave are liberated, which causes the temperature to fall to 100° C. and the pressure to 0 bars; at the same time 1 mole of ammonia and 1 mole of carbon dioxide per mole of hydantoin used are recovered and can be re-used for the synthesis of the hydantoin itself. The latter operation is particularly simple and advantageous if the process is carried out in a tubular autoclave with continuous introduction and removal of the products. It is a third advantage of the invention that in the presence of an acid as defined above, the carbonic acid is non-ionized and converted into carbon dioxide which is insoluble or very slightly soluble at the pressures and temperatures used in the hydrolysis process according to the invention and which can thus be extracted and recovered either at the end or during the course of the hydrolysis.

The solution, after release of the pressure, is neutralized either with a strong acid, such as hydrochloric or sulphuric acid or, according to a preferred feature of the invention, with the same acid as was used for partial neutralization of the caustic soda used for hydrolysis; it is then cooled to crystallize the aminoacid formed.

The substitutents R and R' in the hydantoin can be hydrogen or any desired organic radical and all hydantoins which give a useful α-aminoacid can be used.

Among the hydantoins to which the present process can be applied are, for example, hydantoin, 5-methyl-hydantoin, 5,5-dimethyl-hydantoin, 5-propyl-hydantoin, 5-isopropylhydantoin, 5-(2-methylthioethyl)-hydantoin, 5-(2-hydroxyethyl)-hydantoin, 5-isobutyl-hydantoin, 5-sec. butyl-hydantoin, 5 - benzylhydantoin, 5-(4-aminobutyl)-hydantoin, 5-(3-indolymethyl)-hydantoin, 5-(2-carboxyethyl)-hydantoin, and 5-(3-carboxypropyl)-hydantoin.

In order that the invention may be more fully understood, the following examples are given by way of illustration only:

EXAMPLE 1

Five runs were carried out; in each case sulphur dioxide was added to a solution obtained from the synthesis of 5-(2-methylmercaptoethyl)-hydantoin and containing the latter and 1 gram molecule of caustic soda, the solution being at a temperature of 20° C., to obtain a final pH of 9.25, which corresponded to 0.27±0.03 mole of $SO_2$ per mole of caustic soda or of hydantoin. Water was then added to the solution to bring its weight to 1300 g.

The solution was then hydrolyzed in a closed and agitated autoclave at the temperature and for the time indicated in Table 1 below, the pressure being that which was autogeneously established.

At the end of the reaction time, the pressure in the autoclave was released and the ammonia and carbon dioxide formed by hydrolysis escaped together with water vapor and the temperature fell back to 100° C.

The hot contents of the autoclave were transferred to a beaker and neutralized to pH 6.8 with an amount of $SO_2$ corresponding to 0.3±0.03 mole of $SO_2$. By cooling to 10° C., about 85% of the methionine present crystallized. The methionine was filtered off, washed with iced water and dried; it was very white and had a purity of more than 98%. The rest of the methionine was precipitated in the form of its cupric salt, filtered, washed and dried. The yield was calculated from the sum of the amounts of methionine in the two precipitates thus obtained.

TABLE 1

| Run number | Temperature (° C.) | Time (min.) | Methionine (g.) | Yield (percent) |
|---|---|---|---|---|
| 1 | 120 | 120 | 131 | 88 |
| 2 | 135 | 60 | 137 | 92 |
| 3 | 150 | 35 | 141.5 | 95 |
| 4 | 165 | 24 | 143 | 96 |
| 5 | 180 | 10 | 140 | 94 |

EXAMPLE 2

Four solutions containing, per mole of hydantoin, 1 mole of caustic soda and 0.27±0.03 mole of $SO_2$, having a pH of 9.25 and at a temperature of 20° C., were prepared as described in Example 1. They were hydrolyzed in an agitated autoclave at the temperatures and for the times indicated in Table 2 while regulating the pressure maintained in the autoclave to the values indicated in Table 2 by a needle valve. The greater part of the ammonia and the carbon dioxide formed by the hydrolysis was thus liberated. At the end of the reaction, the methionine was recovered as described in Example 1.

TABLE 2

| Run number | Temperature (° C.) | Time (min.) | Pressure (bars) | Methionine (g.) | Yield (percent) |
|---|---|---|---|---|---|
| 1 | 120 | 90 | 2.2 | 129 | 86.5 |
| 2 | 135 | 60 | 3.4 | 135 | 90.5 |
| 3 | 150 | 30 | 5.5 | 141 | 94.5 |
| 4 | 165 | 15 | 7.5 | 140 | 94 |

EXAMPLE 3

Several liters of solution prepared as in Example 1 and containing, per liter of water, about 1 mole of hydantoin, 1 mole of sodium hydroxide and 0.27 mole of sulphur dioxide, were continuously hydrolyzed in a tubular autoclave consisting of a stainless steel tube 3 m. long and 18.1 mm. in diameter wound in a spiral and positioned in a bath of electrically heated oil.

The hydantoin solution was introduced by a metering pump into one end of the tube; at the other end, the hydrolyzed solution was discharged through a closed float-type drain-cock into a reservoir, where it expanded and cooled to 100° C.

In each test, the pump delivery was adjusted to obtain residence times comparable with those in Example 1 for each temperature. When the desired operating conditions had been achieved, the hydrolyzed solution was sampled for exactly 10 minutes and the yield in moles of methionine obtained, as determined by analysis, per mole of hydantoin introduced during the same time was calculated. The results are given in Table III.

TABLE 3

| Run number | Supply (liters/hr.) | Temperature (° C.) | Yield, mole/mole (percent) |
|---|---|---|---|
| 1 | 0.350 | 120 | 85 |
| 2 | 0.700 | 135 | 89 |
| 3 | 1.200 | 150 | 92 |
| 4 | 1.600 | 165 | 95 |
| 5 | 3.000 | 180 | 95 |

EXAMPLE 4

0.33 mole of phosphoric acid was added to a number of solutions prepared as in Example 1, each solution containing 1 mole of hydantoin and 1 mole of sodium hydroxide.

Each of the resulting solutions was hydrolyzed in a closed and agitated autoclave at the temperatures and for the times shown in Table 4, the pressure being that which was autogenously established.

At the end of the reaction times, the pressure in the autoclave was released and the ammonia, carbon dioxide and water vapor were allowed to escape, and the temperature fell back to 100° C.

The contents of the autoclave were transferred to a beaker and 37 g. of calcium hydroxide were added. A tricalcium phosphate precipitate formed and was filtered while hot, after boiling for a few minutes. The clear solution was neutralized to pH 6.8 with concentrated sulphuric acid. Neutralization and cooling gave a first crop of 98–99% pure methionine. A second crop, in the form of the cupric salt, was obtained by acidification and the addition of cupric sulphate.

The calculation of the yields was based on the total amount of methionine in the two crops.

TABLE 4

| Run number | Temperature (° C.) | Duration (min.) | Methionine (g.) | Yield (percent) |
|---|---|---|---|---|
| 1 | 150 | 40 | 129 | 86.6 |
| 2 | 160 | 25 | 135 | 90.6 |
| 3 | 170 | 15 | 143 | 96 |
| 4 | 180 | 10 | 141 | 94.7 |

EXAMPLE 5

5-(4-aminobutyl)-hydantoin was prepared from 5-cyanobutyraldehyde. 0.33 mole of trisodium phosphate was added to a number of solutions, each containing 1 mole of this hydantoin, and the solutions were hydrolyzed in a closed and agitated autoclave at the temperatures and for the times shown in Table 5, the pressure being that which was autogenously established.

After the pressure had been released and the solutions had been transferred, the phosphoric ion was eliminated with lime, after which the solution was neutralized to pH 7 with hydrochloric acid and partially concentrated. 98% pure lysine crystallized on cooling. A second, less pure, crop was obtained after reconcentration.

The yields were calculated on the total amount of lysine in the two crops and the proportion of lysine found in the residual liquors.

TABLE 5

| Run number | Temperature (° C.) | Duration (min.) | Lysine (g.) | Yield (percent) |
|---|---|---|---|---|
| 1 | 135 | 60 | 126 | 86.3 |
| 2 | 150 | 30 | 132 | 90.4 |
| 3 | 165 | 20 | 135 | 92.5 |

EXAMPLE 6

5 - (4 - aminobutyl)-hydantoin prepared as described in Example 5, was separated into its two L and D optical isomers. Two solutions, each containing one isomer, were hydrolyzed at 150° C. and worked up as described in Example 5. The lysine yields were 131 and 132 g., that is 89.7 and 90.4%, respectively. The corresponding L and D lysines were obtained with a small racemization ratio.

EXAMPLE 7

For each of the runs of this example, a solution was prepared containing approximately 1 mole of the hydantoin in question and approximately 0.33 mole of trisodium phosphate.

Each of the resulting solutions was hydrolyzed in a closed and agitated autoclave with rapid heating to 165° C. They were kept at this temperature for 20 minutes, the pressure being that which was autogenously established.

At the end of the reaction mixture was cooled to about 100° C. by rapid release of the pressure. The contents of the autoclave were then transferred to a beaker, 0.5 mole of calcium hydroxide was added, and the mixture was gently boiled. The precipitated calcium phosphate was filtered while hot and washed with hot water. The filtered solution was partly concentrated and then neutralized with concentrated acid to the isoelectric point of the corresponding aminoacid. A first crop of aminoacid was crystallized on cooling, and this was filtered off, washed and dried. The rest of the aminoacid, which had not crystallized, was determined in the mother liquors.

The hydantoins which were hydrolyzed, the aminoacids obtained therefrom, and the yields are given in Table 6. The yields given are the molar yields of isolated, analyzed aminoacid plus the aminoacid determined in the mother liquors, with respect to the hydantoin used.

TABLE 6

| Hydantoins | Amino acids | Yield, percent |
|---|---|---|
| Hydantoin | Glycine | 76 |
| 5-methyl-hydantoin | Alanine | 80 |
| 5,5-dimethyl-hydantoin | Aminomethyl-propanoic acid | 78 |
| 5-propyl-hydantoin | | 82 |
| 5-isopropyl-hydantoin | Valine | 82 |
| 5-isobutyl-hydantoin | Leucine | 79 |
| 5-sec.butyl-hydantoin | Isoleucine | 81 |
| 5-benzyl-hydantoin | Phenylalanine | 74 |
| 5-(2-hydroxyethyl)-hydantoin | Threonine | 64 |
| 5-(3-indolyl-methyl)-hydantoin | Tryptophane | 62 |
| 5-(2-carboxymethyl)-hydantoin | Aspartic acid | 77 |
| 5-(3-carboxyethyl)-hydantoin | Glutamic acid | 81 |

What I claim is:

1. In a process for the preparation of an alpha-amino carboxylic acid in which the corresponding hydantoin is hydrolyzed in a solution of a base, an improvement comprising effecting the hydrolysis in the presence of an acid which has a disassociation constant of from $1.10^{-2}$ to $1.10^{-12}$ and which because of its greater solubility in water relative to carbonic acid displaces carbonic acid ions from the solution, the amount of acid in relation to the base being such as to produce a pH in the resulting solution of 8.5 to 11.

2. A process according to claim 1, wherein from 0.3 to 1.6 cartion mole equivalents of the base are used per mole of hydantoin.

3. A process according to claim 2, wherein from 0.5 to 1.3 cation mole equivalents of the base are used per mole of hydantoin.

4. A process according to claim 3, wherein the solution is partially neutralized to a pH of from 9 to 10.

5. A process according to claim 1 wherein hydrolysis is effected at a temperature of from 120° to 180° C. for a period of from 10 to 90 minutes.

6. A process according to claim 5, wherein hydrolysis is effected at a temperature of from 135° to 170° C. for a period of from 10 to 45 minutes.

7. A process according to claim 1 wherein hydrolysis is effected in a closed autoclave under autogenous pressure.

8. A process according to claim 1 wherein hydrolysis is effected under a pressure which is maintained substantially constant by the release of ammonia, carbon dioxide and water vapor.

9. A process according to claim 1 wherein hydrolysis is effected in a tubular autoclave, said solution comprising the hydantoin, the base and the acid being introduced at one end of the autoclave and the reaction mixture on completion of hydrolysis being discharged at the other end of the autoclave and expanded to atmospheric pressure to release the ammonia and carbon dioxide formed.

10. A process according to claim 1 wherein the formed amino-carboxylic acid is separated by neutralization of the reaction mixture to its iso-electric point.

11. A process according to claim 10, wherein, after separation of the amino-carboxylic acid precipitated by neutralization to the iso-electric point, an additional quantity of amino-carboxylic acid is recovered by concentrating the mother liquor or precipitation of an insoluble salt of the amino-carboxylic acid.

12. A process according to claim 1 wherein the hydantoin starting material is hydantoin, 5-methyl-hydantoin, 5,5-dimethyl-hydantoin, 5-propyl-hydantoin, 5-isopropyl-hydantoin, 5 - isobutyl-hydantoin, 5 - sec.butyl-hydantoin, 5-benzyl-hydantoin, 5-(2-methylthioethyl)- hydantoin, 5-(2-hydroxyethyl)-hydantoin, 5-(4-aminobutyl)-hydantoin, 5-(3-indolylmethyl)-hydantoin, 5-(2-carboxyethyl)-hydantoin, or 5-(3-carboxypropyl)hydantoin.

13. A process according to claim 1 wherein the acid present during hydrolysis is formic, acetic, oxalic, phosphoric, sulphurous or sulphuric acid.

14. A process according to claim 2 wherein the base is NaOH and the mole equivalents of acid per mole of NaOH is 0.5 to 0.9.

References Cited

UNITED STATES PATENTS 2,557,920  6/1951  White _____ 260—326.14 T

JOSEPH A. NARCAVAGE, Primary Examiner

U.S. Cl. X.R.

260—518 R, 534 R, 534 C, 534 E, 534 G, 534 L, 534 M, 534 S